United States Patent [19]

Leuerer

[11] Patent Number: 4,568,185

[45] Date of Patent: Feb. 4, 1986

[54] MEASURING TABLE FOR DENSITOMETRIC ANALYSIS OF PRINTED SHEETS

[75] Inventor: Dieterich R. K. Leuerer, Wurzburg, Fed. Rep. of Germany

[73] Assignee: Koenig & Bauer Aktiengesellschaft, Wurzburg, Fed. Rep. of Germany

[21] Appl. No.: 496,684

[22] Filed: May 20, 1983

[30] Foreign Application Priority Data

Jun. 3, 1982 [DE] Fed. Rep. of Germany ....... 3220799

[51] Int. Cl.[4] ..................... G01N 21/00; G01N 21/02; G01N 21/22

[52] U.S. Cl. .................................... 356/244; 356/425; 356/443; 356/444

[58] Field of Search ................ 356/244, 443, 444, 425

[56] References Cited

U.S. PATENT DOCUMENTS 2,406,716 8/1946 Sweet .................................. 356/443

2,956,473 10/1960 Hunter ................................ 356/443

3,518,013 9/1966 Sanford et al. ................. 356/244 X

FOREIGN PATENT DOCUMENTS 2043883 10/1980 United Kingdom .

OTHER PUBLICATIONS

Sweet et al., "Automatic Recording and Analyzing Densitometer for Reflection and Transmission Densities".

Photographic Science and Exp., vol. 3, No. 3, May–Jun. 1959.

*Primary Examiner*—John E. Kittle

*Assistant Examiner*—Mukund J. Shah

*Attorney, Agent, or Firm*—Jones, Tullar & Cooper

[57] ABSTRACT

A measuring table for facilitating the accurate densitometric measurement of a measuring field strip on a paper sheet is disclosed. The table carries a removable hold-down plate that is positioned between side stop rails and a registering rail. The hold-down plate is held in place on the table by cooperating electromagnets and ferromagnetic metal disks and holds a sheet of paper in place between the plate and the table's surface. The hold-down plate also includes a measuring slot so that a densitometer positioned on the upper surface of the plate is afforded optical access to the measuring field strip imprinted on the paper sheet.

3 Claims, 2 Drawing Figures

MEASURING TABLE FOR DENSITOMETRIC ANALYSIS OF PRINTED SHEETS

FIELD OF THE INVENTION

The present invention is directed generally to a measuring table for printed sheets. More particularly, the present invention is directed to a measuring table for densitometric analysis of printed sheets. Most specifically, the present invention is directed to a measuring table for densitometric analysis of printed sheets in which the table is provided with a hold-down plate that covers the sheet being measured. The table includes spaced registering bars and a transparent hold-down plate which is positionable between these bars. The hold-down plate is held on the measuring table by electromagnets or the like and protects the sheet being measured. A densitometer is freely supported on the hold-down sheet and is afforded unobstructed optical access to the sheet through a measuring slot formed in the hold-down plate.

DESCRIPTION OF THE PRIOR ART

Measuring tables that are equipped with traveling densitometers. and which are intended to measure a printed sheet are generally known in the art, as may be seen, for example in the German "ROLAND NACHRICHTEN 40." In that arrangement, a printed sheet that carries an imprinted measuring field strip is registered against a stop on the measuring table. An electromotively driven measuring head is caused to move across the sheet and transfers the measured values from the measuring field strip to a micro-computer. It is important that the measuring head or heads of the densitometer are maintained at a fixed distance from the printed sheet and this is usually accomplished by supporting the densitometer head by means of a roller or rollers which contact the sheet. However, as the densitometer travels over the surface of the sheet, the rollers produce creases in the paper. These creases change the distance between the densitometer head and the surface of the paper. Such changes in the distance between the head and the measuring field strips result in the production of inexact and incorrect measured values. The direct contact of the rollers which support the densitometer on the printed sheet may also soil or damage the printed sheet.

SUMMARY OF THE INVENTION

It is an object of the present invention to provide a measuring table for printed sheets.

Another object of the present invention is to provide a measuring table for densitometric measurements of printed sheets.

A further object of the present invention is to provide a measuring table having a hold-down plate.

Yet another object of the present invention is to provide a measuring table having spaced registering bars.

Still a further object of the present invention is to provide a measuring table having a feed-in slot for the paper sheet.

As will be set forth in greater detail in the description of the preferred embodiment, the measuring table in accordance with the present invention includes a hold-down plate formed of a transparent material and sized to be placed between registering bars. The hold-down plate is releasably held on the table by suitable means such as electromagnets. A horizontal measuring slot is placed in the hold-down plate so that a movable densitometer can be afforded clear optical access to a printed measuring field strip carried on the paper web.

Since the movable densitometer contacts only the upper surface of the hold-down plate and not the printed sheet itself, there is no possiblity of the sheet becoming creased or curving up at the measuring points. Thus the distance between the densitometer and the field strip on the sheet remains constant and no errors due to distance change are possible.

The measuring table and hold-down plate in accordance with the present invention are suitably sized and the elongated measuring slot is similarly sized so that access to the measuring field strip is possible regardless of the positioning of the strip on the sheet. All of the width of the sheet is accessible to the densitometer.

The hold-down plate is held on the measuring table by the cooperation of ferromagnetic disks in the plate and electromagnets in the table. During positioning of the sheet on the table, the electromagnets are shut off but once the sheet is in place, they are actuated. Since the paper sheet is positioned on the table between the hold-down plate and the top of the table, it is held in position during the travel of the densitometer. Thus, the sheet cannot shift during the measurement taking and inexact measurements due to paper shifting are eliminated.

BRIEF DESCRIPTION OF THE DRAWINGS

While the novel features of the measuring table for printed sheets in accordance with the present invention are set forth with particularity in the appended claims, a full and complete understanding of the invention may be had by referring to the detailed description of a preferred embodiment, as set forth hereinafter and as may be seen in the accompanying drawings in which:

DESCRIPTION OF A PREFERRED EMBODIMENT

Figure 1:
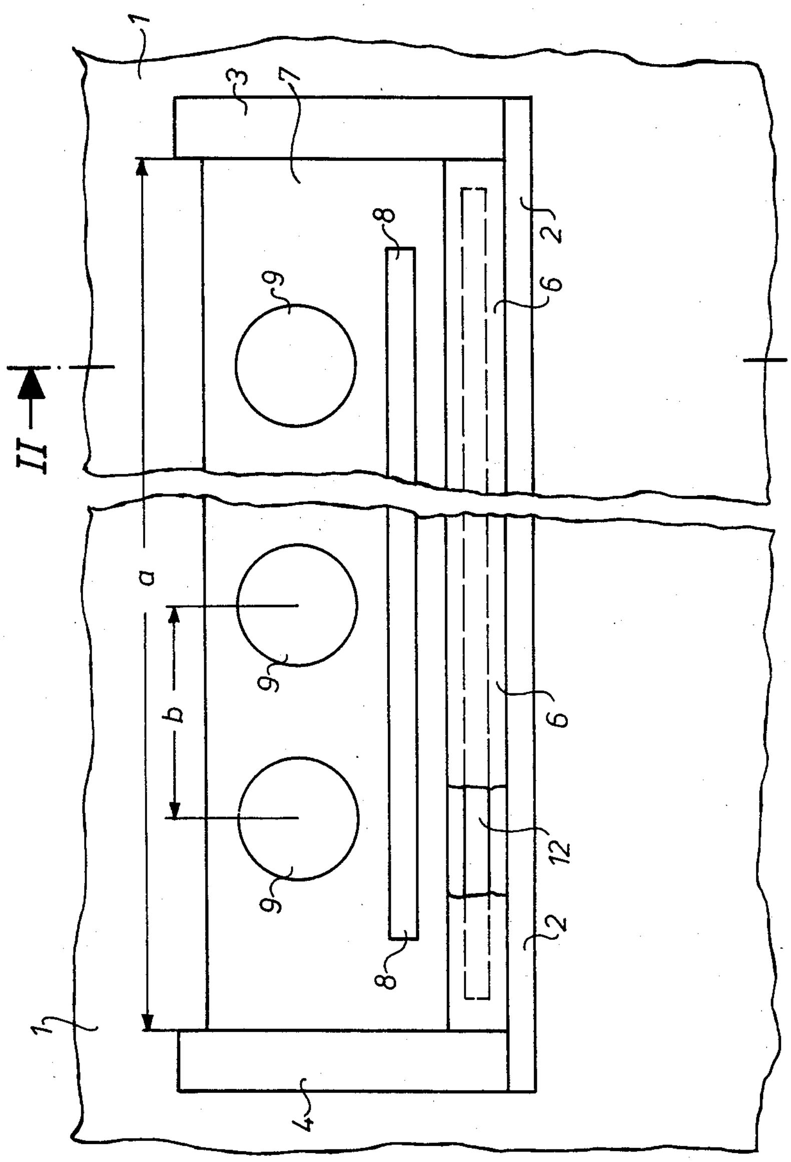
FIG. 1, is a top plan view of the measuring table for printed sheets in accordance with the present invention.

Referring initially to FIG. 1, there may be seen a preferred embodiment of a measuring table for printed sheets in accordance with the present invention. A table top 1 of a generally well known measuring desk used for densitometric analysis of printed sheets is provided with a lower or inferior horizontal registering bar 2. This bar 2 is secured to the surface of table 1 in any suitable manner and is not intended to move. Lower registering bar 2 is sized to be longer than the maximum sheet width to be measured. A right side stop rail 3 is fixed to the top of table 1 and extends vertically upwardly from the right end of lower registering bar 2. A similar left side stop rail 4 extends vertically upwardly from the left end of the lower registering bar 2. Right and left stop rails 3 and 4 are spaced from each other a distance "a" which is also greater than the maximum width of the sheet to be measured. A registering rail 6 is removably positioned between right and left stop rails 3 and 4 adjacent the lower registering bar 2. The registering rail 6, the lower registering bar 2 and the right and left stop rails 3 and 4 are all, in the preferred embodiment, made of metal and are preferably all of the same thickness.

A hold-down plate, whose purpose is to hold the sheet on the top of table 1, is positioned between the right and left side stop rails 3 and 4, and the registering rail 6, as may be seen in FIG. 1. Hold-down plate 7, is in the preferred embodiment, made of a transparent material such as plexiglass. A horizontal measuring slot 8 is formed in the lower portion of hold-down plate 7 and, as may be seen in FIG. 2, extends through plate 7. In the preferred embodiment, measuring slot is approximately 8 mm wide and extends generally across the width of hold-down plate 7 before terminating approximately 20 mm before the side edges of the hold-down plate 7.

Figure 2:
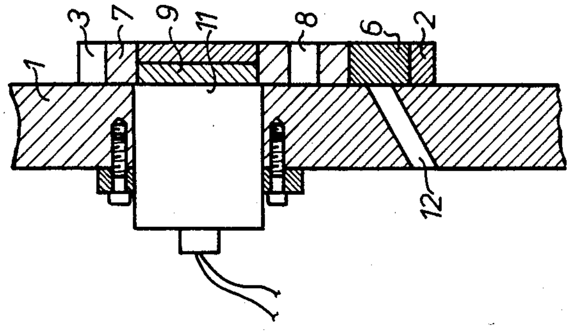
FIG. 2, is a cross-sectional view of the measuring table taken along line II—II of FIG. 1.

A plurality of ferromagnetic metal circles or disks 9 are countersunk in the bottom surface of hold-down plate 7, as is shown in FIGS. 1 and 2. These disks 9 extend inwardly into the plate 7 and are located generally in the upper third of the hold-down plate 7. In the preferred embodiment there are shown three such circles or disks 9 spaced at a distance "b" from each other. It will be understood however, that the number and spacing of disks can vary. Each ferromagnetic metal disk 9 overlies a pole surface of a d.c. current annular magnet 11 which is located in the surface of table 1, as may be seen in FIG. 3. When the electromagnets 11 are actuated, they cooperate with the ferromagnetic metal disks 9 to secure the hold-down plate 7 on the surface of the table 1.

A feed slot 12 passes through table 1, as may be seen in FIG. 2 and underlies the registering rail 6. This feed slot 12 is wider than the maximum width of the sheet to be measured. In use, the registering rail 6 is lifted off the surface of the table and the sheet is passed through the feed slot 12 onto the surface of table 1. Once the sheet has been positioned under the hold-down plate 7, current is supplied to the electromagnets 11. Plate 7 is thus securely held in place and acts to clamp the sheet between the table 1 and the hold-down plate 7. The measuring field strip is positioned so that it is aligned with the horizontal measuring slot 8. A densitometer is positioned on the upper surface of the hold-down plate 7, in optical communication with the measuring field strip through measuring slot 8. Thus the densitometer can measure the densitometric color valves without having any physical contact between the densitometer's support rollers and the paper sheet itself. Accordingly, the inexact readings previously caused by sheet creases and the like are eliminated through the use of the measuring table for paper sheets in accordance with the present invention.

While a preferred embodiment of a measuring table for paper sheets has been fully and completely set forth hereinabove, it will be obvious to one of ordinary skill in the art that a number of changes in, for example, the specific materials used, the sizes of the components, the number of magnets and the like could be made without departing from the true spirit and scope of the invention and that the invention is hence to be limited only by the following claims.

I claim:

1. A measuring table assembly for use in recording densitometrical values from a measuring field strip imprinted on a sheet of material by passage of a densitometer over the measuring field strip imprinted on the sheet of material, said measuring table comprising:

- a generally horizontal table top;
- a lower horizontal registering bar and spaced left and right side stop rails secured to said table top;
- a hold-down plate removably positioned on said table top within said lower horizontal registering bar and said spaced left and right side stop rails;
- a plurality of ferromagnetic metal disks countersunk in said hold-down plate and a plurality of annular magnets cooperatively positioned on said table top, said disks and said magnets cooperating to hold said hold-down plate on said table top; and
- a registering rail positionable on said table top intermediate said lower horizontal registering bar and said hold-down plate to define the position of said hold-down plate on said table top.

2. The measuring table of claim 1 wherein said hold-down plate includes a horizontal measuring slot.

3. The measuring table of claim 1 further including a feed slot passing through said table top, said feed slot being covered by said registering rail and being substantially wider than the sheet of material whereby the sheet of material can pass through said feed slot onto said table top.

* * * * *